(12) United States Patent
Han et al.

(10) Patent No.: US 7,352,719 B2
(45) Date of Patent: Apr. 1, 2008

(54) METHOD AND MOBILE COMMUNICATION TERMINAL FOR COMMUNICATING VOICE MESSAGE USING PACKET-SWITCHED SCHEME

(75) Inventors: Sung-Woo Han, Seoul (KR); Jae-Yeol Lee, Seoul (KR)

(73) Assignee: Curitel Communications, Inc., Seoul (KR)

( * ) Notice: Subject to any disclaimer, the term of this patent is extended or adjusted under 35 U.S.C. 154(b) by 496 days.

(21) Appl. No.: 10/973,416

(22) Filed: Oct. 27, 2004

(65) Prior Publication Data

US 2005/0100004 A1    May 12, 2005

(30) Foreign Application Priority Data

Oct. 28, 2003 (KR) .................... 10-2003-0075639

(51) Int. Cl.
*H04Q 7/00* (2006.01)
(52) U.S. Cl. .................. 370/329; 370/352; 370/356; 455/550.1; 455/418
(58) Field of Classification Search ............. 370/329, 370/352, 356; 455/550.1, 418
See application file for complete search history.

(56) References Cited

U.S. PATENT DOCUMENTS

| | | | |
|---|---|---|---|
| 5,697,060 A | | 12/1997 | Akahane |
| 6,563,815 B1* | 5/2003 | Koyama | ................... 370/352 |
| 6,584,110 B1* | 6/2003 | Mizuta et al. | ............. 370/401 |
| 7,075,936 B2* | 7/2006 | Hathaway et al. | ..... 370/395.64 |
| 2001/0019951 A1 | 9/2001 | Haumont et al. | |
| 2001/0021659 A1* | 9/2001 | Okamura | ................... 455/557 |
| 2002/0080782 A1* | 6/2002 | Dick et al. | ................. 370/362 |
| 2003/0002477 A1* | 1/2003 | Israel et al. | ................ 370/352 |

FOREIGN PATENT DOCUMENTS

| | | |
|---|---|---|
| EP | 0 913 982 A2 | 5/1999 |
| EP | 1 033 861 A2 | 9/2000 |
| WO | WO 03/073678 A2 | 9/2003 |

* cited by examiner

*Primary Examiner*—Danh Le
(74) *Attorney, Agent, or Firm*—Oblob, Spivak, McClelland, Maier & Neustadt, P.C.

(57) ABSTRACT

Disclosed are a mobile communication terminal for and a method of transmitting/receiving voice messages using a packet-switched scheme. According to the present invention, it is possible to allow mobile carriers to promote the use efficiency of communication channels since mobile communication terminals transmit/receive voice messages over a data channel rather than a voice channel.

14 Claims, 5 Drawing Sheets

METHOD AND MOBILE COMMUNICATION TERMINAL FOR COMMUNICATING VOICE MESSAGE USING PACKET-SWITCHED SCHEME

BACKGROUND OF THE INVENTION

This application claims the priority of Korean Patent Application No. 2003-75639, filed on Oct. 28, 2003, in the Korean Intellectual Property Office, the disclosure of which is incorporated herein in its entirety by reference.

1. Field of the Invention

The present invention relates to a mobile communication terminal and, more particularly, to a mobile communication terminal for and a method of transmitting/receiving voice messages using a packet-switched scheme.

2. Description of Related Art

In general, a cellular mobile communication system has employed GSM (Global System for Mobile Communications), which is a TDMA (Time Division Multiple Access)-based European standard, PDC (Personal Digital Cellular), which is a TDMA-based Japanese standard, or IS-95 (Interim Standard-95, also called cdmaOne), which is a CDMA (Code Division Multiple Access)-based US standard. The cellular mobile communication system makes it possible to efficiently use limited wireless resources by transmitting voice digitally rather than in analog. In addition, the cellular mobile communication system supports digital data transmission as well as voice transmission. In the very early phase of introduction of the cellular mobile communication system, it has employed a circuit-switched scheme since it has been originally developed for voice oriented services. In the circuit-switched scheme, a communication circuit for a call is set up and dedicated to the participants in that call. Accordingly, for the duration of the connection, all resources on that circuit are unavailable for other users.

Mobile carriers employing the cellular mobile communication system provide a voice mail service for storing a calling party's voice messages in the case when a called party is busy or the called party's mobile phone is powered off. However, as described above, since the conventional cellular mobile communication system employs the circuit-switched scheme, a communication circuit for the voice mail service is dedicated to the calling party for the duration of the connection.

As a result, the voice mail service based on the circuit-switched scheme causes inconvenience to both mobile carriers and users as the number of users of the mobile communication services increases or the users use the mobile communication services more frequently.

On the other hand, with the development of mobile communications technologies, mobile communication terminals which have been recently put on the market allow users to access the Internet to use web services, store and send multimedia messages, such as text, speech, still image, video, animation, and music, to other users. The mobile carriers also provide multimedia message services by using communication modules for supporting communication protocols for connecting mobile communication terminals with web servers or transmitting/receiving multimedia messages between the mobile communication terminals, and networks for supporting the packet-switched scheme. The packet-switched scheme allows the same data path to be shared among many users in the network. Further, the charge for the service using the packet-switched scheme is based on the amount of packet data.

However, the mobile communication terminal is more frequently used for voice communications than for multimedia messages. Accordingly, a new mobile communication terminal capable of transmitting voice messages over a data channel rather than a voice channel needs to be developed.

SUMMARY OF THE INVENTION

The present invention provides a mobile communication terminal for transmitting/receiving a voice message using a packet-switched scheme rather than a circuit-switched scheme.

The present invention also provides a mobile communication terminal for storing a voice message in a memory and in turn transmitting/confirming/re-recording the voice message over a data channel according to user's choice.

The present invention also provides a mobile communication terminal for packetizing and transmitting a voice message over a data channel in case of insufficient memory.

The present invention also provides a method of transmitting/receiving a voice message using a packet-switched scheme in a mobile communication terminal.

The present invention also provides a voice message service system for transmitting/receiving a voice message using a packet-switched scheme.

In accordance with an aspect of the present invention, there is provided a mobile communication terminal comprising: a communication unit for transmitting/receiving data signals over a mobile communication network; a communication controller for controlling communication setup and termination in response to a signal inputted from the outside; and a packet processor for packetizing voice data inputted from the outside and outputting the packetized voice data to the communication unit in response to a control signal of the communication controller.

The communication controller may comprise: automatic voice channel releasing means for automatically terminating a voice channel connection upon receiving a connection failure signal from the communication unit; and automatic data channel connection means for outputting a data channel connection request signal upon receiving the connection failure signal from the communication unit.

The mobile communication terminal may further comprise a memory unit for storing data packetized in the packet processor.

The mobile communication terminal may further comprise a memory controller for checking the available memory capacity of the memory unit to determine whether or not to be able to store the packetized data, and outputting the check result to the communication controller.

Upon receiving from the memory controller a signal indicating that there is a memory available to store packets, the automatic data channel connection means may store the packetized data in the memory unit and output a data channel connection request signal to the communication unit in response to a voice channel termination signal inputted from the automatic voice channel releasing means.

Upon receiving from the memory controller a signal indicating that there is no memory available to store packets, the automatic data channel connection means may output a data channel connection request signal to the communication unit in response to a voice channel termination signal inputted from the automatic voice channel releasing means.

In accordance with another aspect of the present invention, there is provided a voice message transmission system comprising: the above-mentioned mobile communication terminal for transmitting/receiving a voice message using a packet-switched scheme; a mobile switching center for performing a switching operation for a packetized voice message transmitted/received to/from the mobile communication terminal; and a voice mail unit which includes a packet control unit for receiving the packetized voice message from the mobile switching center and storing the packetized voice message in a voice message database on a packet-by-packet basis.

In accordance with another aspect of the present invention, there is provided a voice message transmission system comprising: the above-mentioned mobile communication terminal for transmitting/receiving a voice message using a packet-switched scheme; a mobile switching center for performing a switching operation for a packetized voice message transmitted/received to/from the mobile communication terminal; and a content server for receiving the packetized voice message from the mobile switching center, storing the packetized voice message in a voice message database on a packet-by-packet basis, and outputting each packet to the mobile switching center in response to a corresponding packet request signal of the mobile communication terminal.

In accordance with another aspect of the present invention, there is provided a method of transmitting a voice message of a mobile communication terminal in the voice message transmission system, comprising the steps of: receiving a communication connection request signal from the outside; outputting a voice channel connection request signal via a mobile communication network; terminating a voice channel connection upon receiving a connection failure signal via the mobile communication network; outputting a data channel connection request signal via the mobile communication network and connecting a data channel in response to a return signal indicative of a connection to the data channel; receiving and packetizing voice data from the outside; and transmitting the packetized data via the mobile communication network.

The method may further comprise the steps of: checking the available memory capacity of a memory unit in the mobile communication terminal to determine whether or not to be able to store the packetized data; and storing the packetized data when there is available memory.

The method may further comprise the step of deleting the packetized data stored in the memory unit of the mobile communication terminal after the packetized data is transmitted via the mobile communication network.

The method may further comprise the step of receiving a signal indicative of a request to confirm the voice data inputted from the outside and converting the voice data into audio signals to be played back.

The method may further comprise the step of receiving a signal indicative of a request to re-record the voice data inputted from the outside and deleting the voice data.

In accordance with another aspect of the present invention, there is provided a method of transmitting a voice message of a mobile communication terminal in the voice message transmission system, comprising the steps of: receiving a communication connection request signal from the outside; outputting a voice channel connection request signal via a mobile communication network; terminating a voice channel connection upon receiving a connection failure signal via the mobile communication network; outputting a data channel connection request signal via the mobile communication network and connecting a data channel in response to a return signal indicative of a connection to the data channel; receiving voice data from the outside and storing the voice data in a memory unit of the mobile communication terminal; packetizing the voice data stored in the memory unit; and transmitting the packetized data via the mobile communication network.

The method may further comprise the step of deleting the packetized data stored in the memory unit of the mobile communication terminal after the packetized data is transmitted via the mobile communication network.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
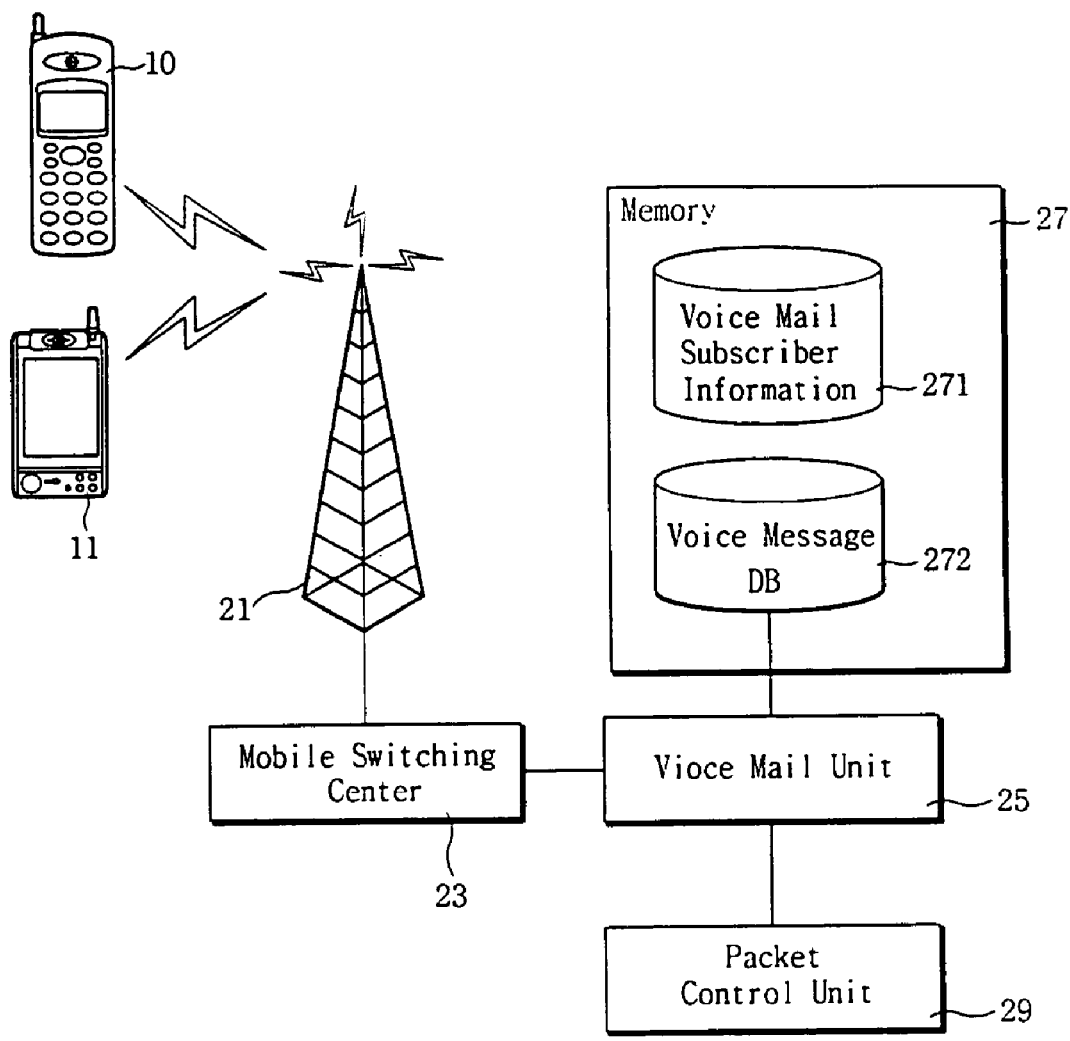
FIG. 1 is a schematic diagram showing a voice message service system in accordance with an embodiment of the present invention.

FIG. 1 is a schematic diagram showing a voice message service system in accordance with an embodiment of the present invention. The voice message service system comprises mobile communication terminals 10 and 11, a base station (BS) 21, a mobile switching center (MSC) 23, and a voice mail unit 25.

Each of the mobile communication terminals 10 and 11 communicates with the BS 21 to notify the MSC 23 of its own location information during power-on. The mobile communication terminals 10 and 11 are preferably implemented so as to packetize and transmit a calling party's voice message over a data channel. The mobile communication terminals 10 and 11 are assumed to be a calling party's and a called party's mobile communication terminals, respectively. In addition, the mobile communication terminals 10 and 11 are preferably registered for a voice mail service.

The BS 21 receives a call origination signal from the calling party's mobile communication terminal 10, assigns an available communication channel, and connects the mobile communication terminal 10 to the MSC 23. The communication channel may be classified into a voice channel and a data channel in terms of communication type.

The MSC 23 receives the call origination signal from the BS 21 and in turn sends a calling signal to the mobile communication terminal 11. After receiving a response signal to the calling signal from the mobile communication terminal 11, the MSC 23 sends communication information to the mobile communication terminal 11. The communication information includes the calling party's mobile communication terminal identification information, the called party's mobile communication terminal identification information, the calling signal type information, channel information, and message information. Upon receiving the communication information, the mobile communication terminal 11 rings. In the case when the calling signal type information indicates information on voice communication, the mobile communication terminal 11 rings until the called party replies to the call or a predetermined time elapses. When the called party replies to the call, the mobile communication terminal 11 sends a channel connection request signal to the MSC 23. Subsequently, the MSC 23 sends a channel connection response signal to the mobile communication terminal 11 and establishes a voice channel between both mobile communication terminals 10 and 11. Alternatively, in the case when the calling signal type information indicates information on message communication, such as text message, voice message, or multimedia message, the mobile communication terminal 11 rings for a short time and displays an icon or a short message relating to the type of message transmitted.

On the other hand, in the case when the mobile communication terminal 11 does not respond to the calling signal, the MSC 23 refers to the voice mail unit 25 to verify whether the mobile communication terminal 11 has been registered for the voice mail service. When the mobile communication terminal 11 has been registered for the voice mail service, the MSC 23 sends instructions for voice mail usage to the mobile communication terminal 10. The MSC 23 transmits a packetized voice message received from the mobile communication terminal 10 to the voice mail unit 25 over a data channel. Upon completion of the transmission, the MSC 23 sends a transmission completion signal to the mobile communication terminal 10. Subsequently, the MSC 23 sends a calling signal to the mobile communication terminal 11 in which a voice message has arrived. Upon receiving a response signal to the calling signal from the mobile communication terminal 11, the MSC 23 transmits communication information, together with the voice message, to the mobile communication terminal 11.

The voice mail unit 25 is provided integrally with or separately from the MSC 23. The voice mail unit 25 may comprise a memory unit 27, which includes voice mail subscriber information 271 and a voice message database (DB) 272, and a packet control unit 29. The voice mail unit 25 can store a transmitted voice message, playback or delete the voice message stored in the voice message DB 272 according to the calling party's choice. The packet control unit 29 is responsible for the error control and compression-transmission of packet data arriving in the called party's mobile communication terminal 11 which has been registered for the voice mail service. The packet control unit 29 is also responsible for storing the packet data in the voice message DB 272 on a date/time basis.

Figure 2:
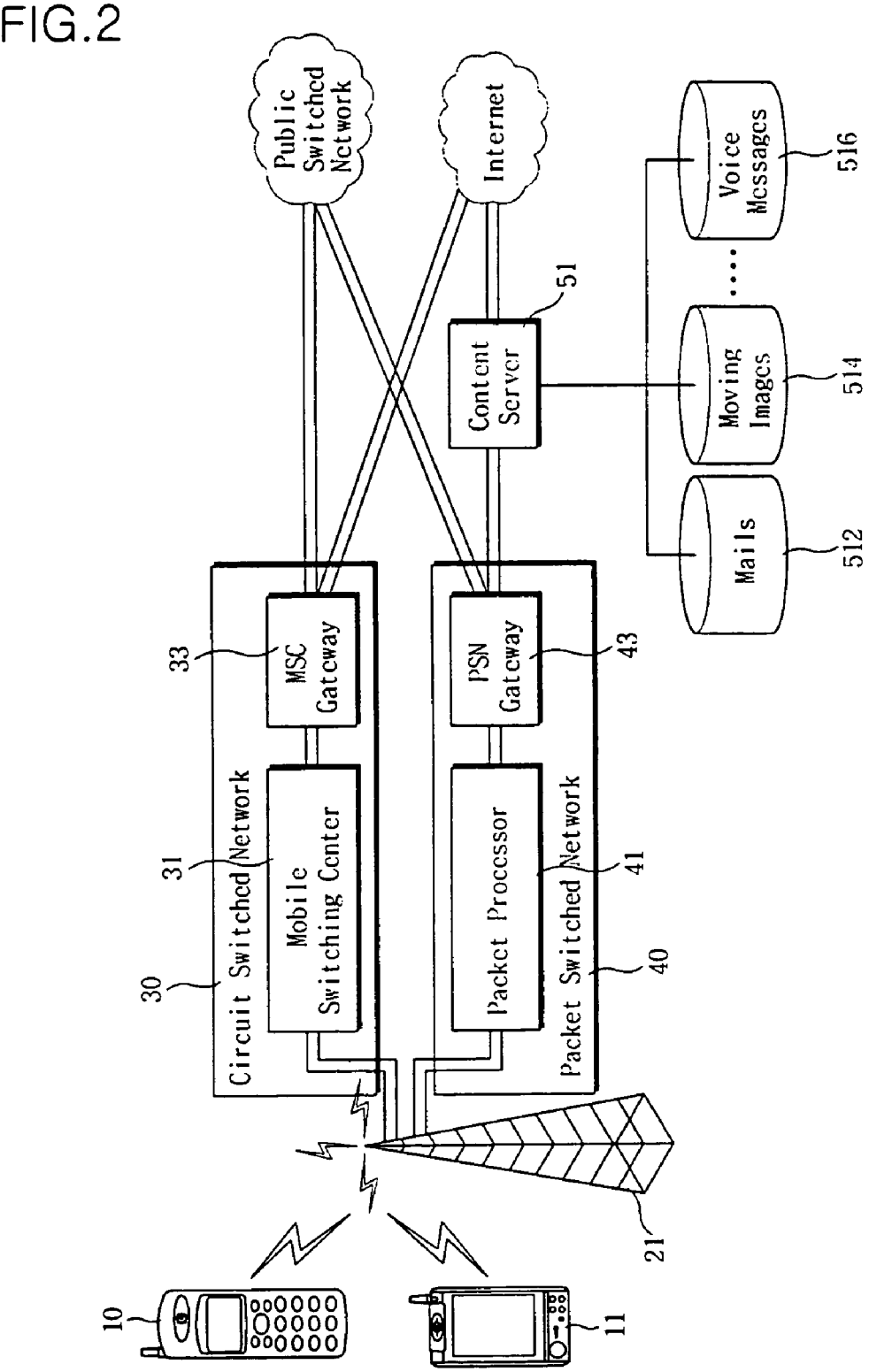
FIG. 2 is a schematic diagram showing a voice message service system in accordance with another embodiment of the present invention.

FIG. 2 is a schematic diagram showing a voice message service system in accordance with another embodiment of the present invention, where the same as components shown in FIG. 1 are denoted by the same reference numerals. The voice message service system employs both circuit-switched and packet-switched schemes, the configurations of which vary depending on a cellular mobile communication system. In the present embodiment, only the essential configurations of the voice message service system are now briefly set forth for understanding of the voice message service system. The voice message service system comprises the mobile communication terminals 10 and 11, the BS 21, a circuit switched network 30, and a packet switched network 40.

The mobile communication terminals 10 and 11 are preferably equipped with a function of using wireless Internet services via wireless application protocol (WAP). Unlike the above-mentioned embodiment shown in FIG. 1, the mobile communication terminals 10 and 11 may not be registered for the voice mail service in the present embodiment. That is, in accordance with the present embodiment, the mobile communication terminals 10 and 11 can transmit/receive packetized voice messages via a content server 51. Mobile communication terminal manufacturers are currently putting on the market various kinds of mobile communication terminals for supporting wireless Internet services.

The circuit switched network 30 comprises a mobile switching center (MSC) 31 and an MSC gateway 33 connected to a public mobile communication network or public switched network. The description will not be made here as regard to the configurations and operations of the circuit switched network 30 since they are well known in the art.

A packet switched network 40 comprises a packet processor 41 and a PSN (packet-switched network) gateway 43, which is connected to the content server 51 for transmitting/receiving content over the Internet. The packet processor 41 is responsible for the error control and compression-transmission of packet data transmitted from the mobile communication terminal 10. The PSN gateway 43 allows a user to view and download mails, moving images, animations, etc., which are provided from the content server 51, in the mobile communication terminals 10 and 11 by exchanging data via an Internet protocol supported by the content server 51 and WAP supported by the mobile communication network and the mobile communication terminals 10 and 11.

Upon completion of the transmission of a packetized voice message from the mobile communication terminal 10, the content server 51 can transmit to the mobile communication terminal 11 a short message indicating that the voice message has arrived. Alternatively, in the case when the mobile communication terminal 11 is connected to the content server 51, the content server 51 can transmit a voice message together with a short message.

Figure 3:
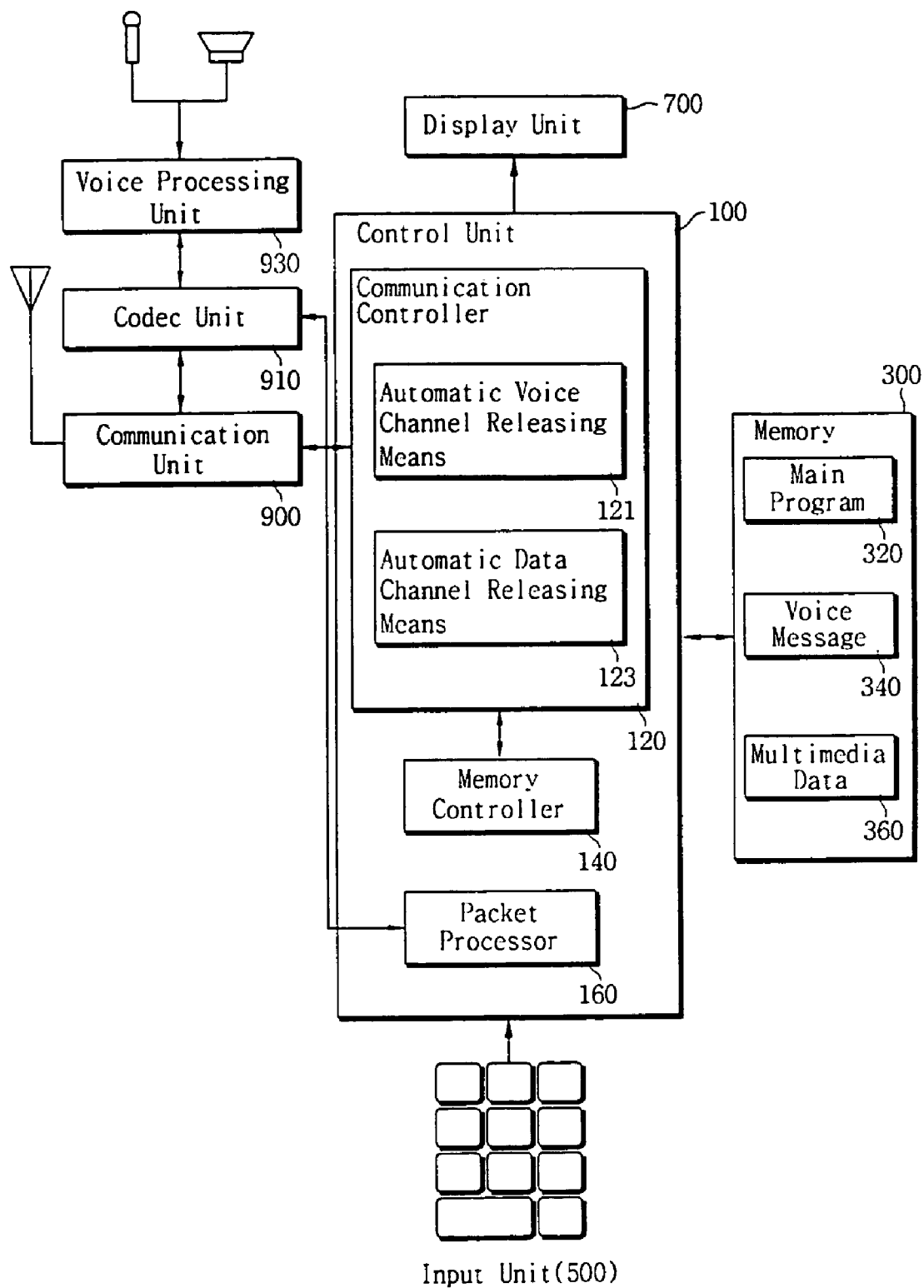
FIG. 3 is block diagram showing the configurations of mobile communication terminal in accordance with an embodiment of the present invention.

FIG. 3 is a block diagram showing the configurations of a mobile communication terminal in accordance with an embodiment of the present invention.

The mobile communication terminal in accordance with the present invention comprises a communication unit 900 for transmitting/receiving data signals over a mobile communication network, a display unit 700 for displaying various kinds of information such as input commands and setup information of the mobile communication terminal, an input unit 500 for inputting user's operation commands, a memory unit 300 for storing various data including program execution data and voice messages, and a control unit 100 for controlling communication connections, packetizing and transmitting/receiving voice messages.

The control unit 100, for example, is implemented with a single microprocessor. Alternatively, the control unit 100 may be formed with two chips, for example, a digital signal processor and a system control microprocessor.

The memory unit 300 stores program execution files, voice message files, etc. In addition, the memory unit 300 is preferably a nonvolatile memory.

The input unit 500, which is one for allowing a user to input operation commands, comprises alphanumeric keys, location keys, function keys, and other special keys for offering functions such as communication, volume control for speakers, and web browser functions. The display unit 700 is one for displaying text and graphic information such as battery residual quantity, play mode, the available capacity of a memory, date and time, initial screen, etc.

The communication unit 900 is a typical circuit for conducting data and voice communications using a CDMA or GSM scheme.

The blocks shown in FIG. 3 are logical blocks and thus do not necessarily match physical blocks. For example, a microprocessor which constitutes a codec unit 910 and a part of a voice processing unit 930 and another microprocessor which constitutes a part of the communication unit 900 and a control unit 100 are packaged into a single chip, which is commercially available.

The control unit 100 comprises a communication controller 120 for outputting a call origination signal to a mobile communication network via the communication unit 900 upon receiving a call connection request signal from the input unit 500, a memory controller 140 for managing resources stored in the memory unit 300, and a packet processor 160 for receiving packets via the communication unit 900, processing data on a packet-by-packet basis, and storing the processed data in the memory unit 300.

The communication controller 120 comprises automatic voice channel releasing means 121 for automatically terminating a voice channel connection upon receiving from the MSC a signal indicative of a connection failure with a called party's mobile communication terminal. The connection failure signal may be a "busy" tone indicating that the line is busy. In case of power-off, the connection failure signal may be a voice message indicating that a called party cannot take the call at that time. Alternatively, the connection failure signal may be instructions for voice mail usage saying "When you hear a tone, please leave a message, then press * or #".

The communication controller 120 further comprises automatic data channel connection means 123 for outputting a data channel connection request signal to the mobile communication network for voice message transmission. When available memory capacity is determined to be sufficient based on information on the available memory capacity received from the memory controller 140, the automatic data channel connection means 123 receives and stores a calling party's voice message, and outputs the data channel connection request signal to the mobile communication network upon receiving a message transmission request signal from the input unit 500. Alternatively, when the available memory capacity is determined to be insufficient, the automatic data channel connection means 123 outputs the data channel connection request signal to the mobile communication network upon receiving a voice channel termination signal from the automatic voice channel releasing means 121.

The memory controller 140 controls memory allocation for voice messages. The packet processor 160 processes and outputs packetized data inputted via the communication unit 900 to the memory 300 on a packet-by-packet basis. In addition, the packet processor 160 packetizes the voice messages outputted from the memory 300 to the mobile communication terminal 11.

Figure 4A:
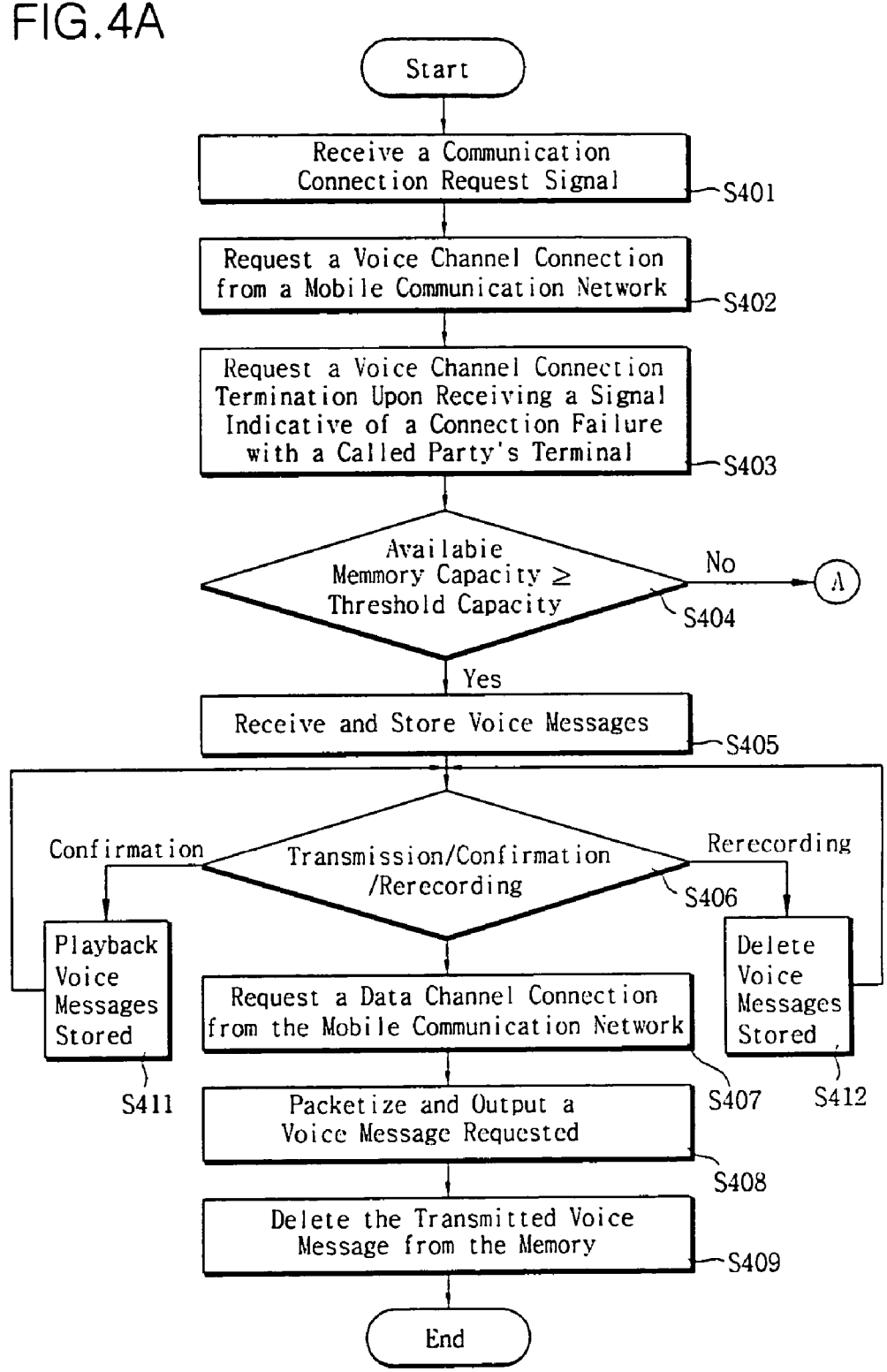
FIGS. 4A and 4B are flowcharts showing a procedure of transmitting voice messages in a mobile communication terminal in accordance with an embodiment of the present invention.
Figure 4B:
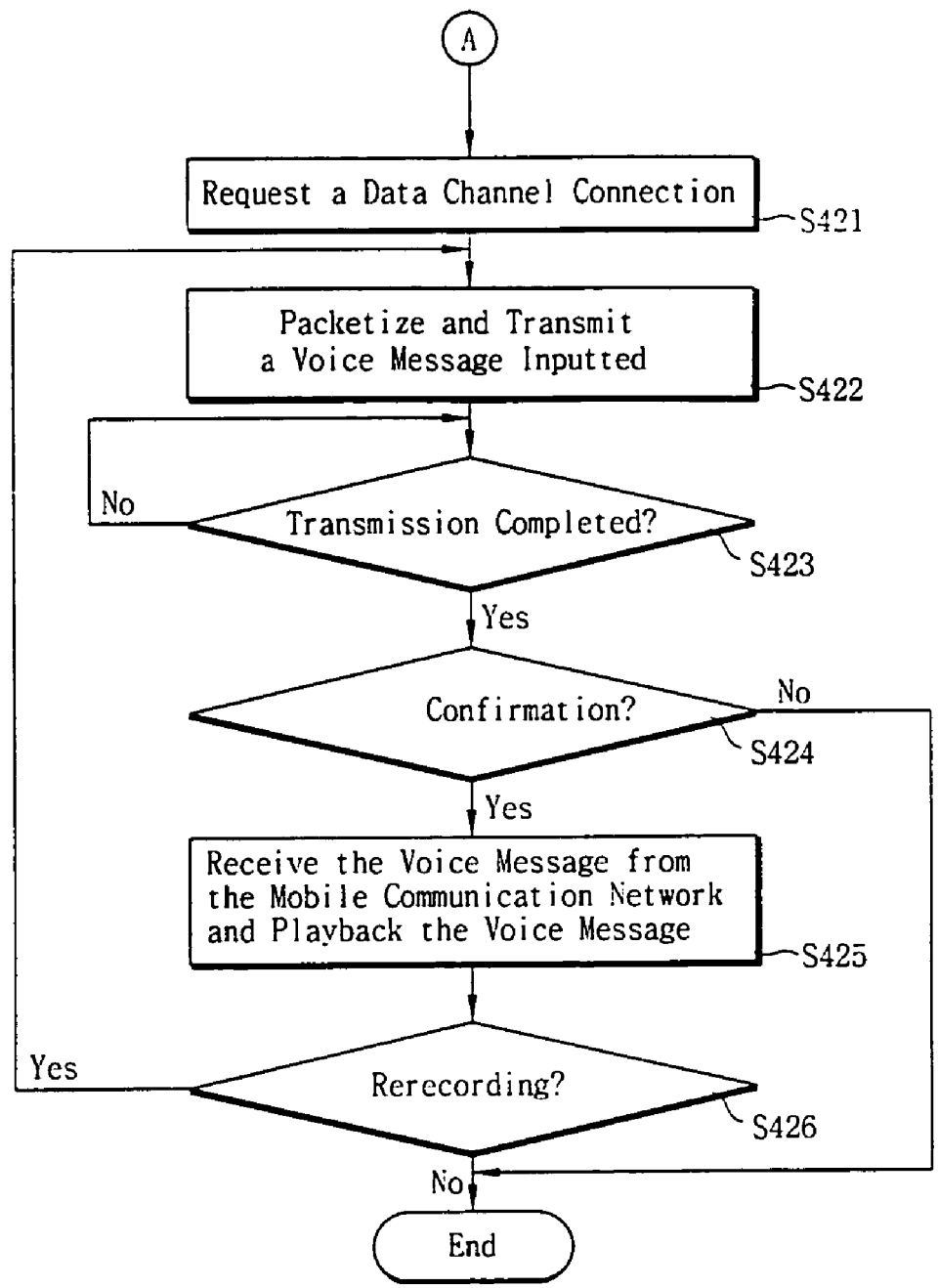

FIGS. 4A and 4B are flowcharts showing a procedure of transmitting/receiving voice messages in a mobile communication terminal in accordance with an embodiment of the present invention. More specifically, FIGS. 4A and 4B are flowcharts showing a procedure of transmitting a calling party's voice message to a called party's mobile communication terminal in the case when there is no reply to the calling party's call.

Referring to FIG. 4A, the control unit 100 receives a communication connection request signal from the input unit 500 (S401). The communication connection request is carried out by inputting a called party's phone number and in turn pressing the 'communication' button. The control unit 100 transmits a voice channel connection request signal to a base station (S402). The base station assigns an available voice channel and transmits a communication request signal to a mobile switching center. The mobile switching center transmits a calling signal to the called party's mobile communication terminal through a typical call processing sequence and waits for a return signal. If the called party's mobile communication terminal is in use or powered off, the mobile switching center sends to the calling party a busy tone or a voice message that making a call connection to the called party is not possible.

The control unit 100 transmits a voice channel connection termination request signal to the base station upon receiving from the mobile switching center a signal indicative of a connection failure with the called party's mobile communication terminal (S403). The communication controller 120 checks and compares the available memory capacity with a preset threshold capacity (S404). When the available memory capacity is determined to be sufficient, the communication controller 120 receives and stores the calling party's voice message in the memory (S405). After the calling party's voice message is recorded, the control unit 100 determines which of transmission/confirmation/re-recording request signals is inputted from the input unit 500 (S406). In case of inputting a transmission request signal, the control unit 100 transmits a data channel connection request signal to the mobile communication network (S407). Upon receiving a data channel connection response signal from the mobile communication network, the control unit 100 packetizes and outputs a voice message requested by the calling party to the mobile communication network (S408). The voice message transmitted to the mobile communication network can be delivered to the voice mail unit 25 through the MSC 23 and stored in the voice message DB 273 (refer to FIG. 1). Alternatively, the voice message transmitted to the mobile communication network can be delivered to the content server 51 through the packet processor 41 and the PSN gateway 43 and stored in a corresponding database (refer to FIG. 2). Subsequently, the control unit 100 deletes the transmitted voice message from the memory (S409).

On the other hand, upon receiving a message confirmation request signal from the input unit 500, the control unit 100 converts the voice message stored in the memory to audio signals through a codec unit and a voice processing unit to allow the calling party to hear the voice message (S411). In addition, upon receiving a message re-recording request signal from the input unit 500, the control unit 100 deletes the voice message stored in the memory (S412).

Referring to FIG. 4B, when the available memory capacity is determined to be insufficient in S404, the control unit 100 transmits a data channel connection request signal to the mobile communication network (S421) to establish a data channel. The control unit 100 packetizes and transmits the calling party's voice message to the mobile communication network over the established data channel (S422). The control unit 100 checks whether the voice message is completely transmitted (S423). After the transmission is completed, the control unit 100 determines whether or not the confirmation request signal is inputted from the input unit 500 (S424). Upon receiving the confirmation request signal from the input unit 500, the control unit 100 transmits the confirmation request signal to the mobile communication network, receives the voice message from the mobile communication network, and converts the voice message to audio signals through the codec unit and the voice processing unit to allow the calling party to hear the voice message (S425). Subsequently, upon receiving a message re-recording request signal from the input unit 500, the control unit 100 transmits the message re-recording request signal to the mobile communication network (S426), and packetizes and transmits the calling party's voice message to the mobile communication network (S422).

According to the present invention, it is possible to allow mobile carriers to promote the use efficiency of communication channels since mobile communication terminals transmit/receive voice messages over a data channel rather than a voice channel.

In addition, it is possible to allow a user to pay the charges for the services on the basis of the amount of transmitted data rather than the time consumed for using the services.

In addition, it is possible to allow a mobile communication terminal to provide a voice message transmission service irrespective of the available memory capacity by transmitting a voice message over a data channel depending on the available memory capacity.

While the present invention has been described in detail with reference to exemplary embodiments thereof, it will be understood by those skilled in the art that various changes in form and details may be made therein without departing from the scope of the present invention as defined by the following claims.

What is claimed is:

1. A mobile communication terminal, comprising:
  a communication unit configured to transmit/receive data signals over a mobile communication network;
  a communication controller configured to control communication setup and termination in response to a signal inputted from the outside, wherein the communication controller includes
    automatic voice channel releasing means for automatically terminating a voice channel connection upon receiving a connection failure signal from the communication unit, and
    automatic data channel connection means for outputting a data channel connection request signal upon receiving the connection failure signal from the communication unit; and
  a packet processor configured to packetize voice data inputted from the outside and outputting the packetized voice data to the communication unit in response to a control signal of the communication controller.

2. The mobile communication terminal of claim 1, further comprising a memory unit configured to store data packetized in the packet processor.

3. The mobile communication terminal of claim 2, further comprising a memory controller configured to check the available memory capacity of the memory unit to determine whether or not there is available memory to store the packetized data, and outputting the check result to the communication controller.

4. The mobile communication terminal of claim 3, wherein upon receiving from the memory controller a signal indicating that there is a memory available to store packets, the automatic data channel connection means stores the packetized data in the memory unit and outputs the data channel connection request signal to the communication unit in response to a voice channel termination signal inputted from the automatic voice channel releasing means.

5. The mobile communication terminal of claim 3, wherein upon receiving from the memory controller a signal indicating that there is no memory available to store packets, the automatic data channel connection means outputs the data channel connection request signal to the communication unit in response to a voice channel termination signal inputted from the automatic voice channel releasing means.

6. A voice message transmission system, comprising:
  a mobile communication terminal configured to transmit/receive a voice message using a packet-switched scheme, wherein the mobile communication terminal includes
    a communication unit configured to transmit/receive data signals over a mobile communication network;
    a communication controller configured to control communication setup and termination in response to a signal inputted from the outside, wherein the communication controller includes
      automatic voice channel releasing means for automatically terminating a voice channel connection upon receiving a connection failure signal from the communication unit, and
      automatic data channel connection means for outputting a data channel connection request signal upon receiving the connection failure signal from the communication unit, and
    a packet processor configured to packetize voice data inputted from the outside and outputting the packetized voice data to the communication unit in response to a control signal of the communication controller;
  a mobile switching center configured to perform a switching operation for a packetized voice message transmitted/received to/from the mobile communication terminal; and
  a voice mail unit which includes a packet control unit configured to receive the packetized voice message from the mobile switching center and to store the packetized voice message in a voice message database on a packet-by-packet basis.

7. A voice message transmission system, comprising:
  a mobile communication terminal configured to transmit/receive a voice message using a packet-switched scheme, wherein the mobile communication terminal includes
    a communication unit configured to transmit/receive data signals over a mobile communication network;
    a communication controller configured to control communication setup and termination in response to a signal inputted from the outside, wherein the communication controller includes
      automatic voice channel releasing means for automatically terminating a voice channel connection upon receiving a connection failure signal from the communication unit, and
      automatic data channel connection means for outputting a data channel connection request signal upon receiving the connection failure signal from the communication unit, and
    a packet processor configured to packetize voice data inputted from the outside and outputting the packetized voice data to the communication unit in response to a control signal of the communication controller;
  a mobile switching center configured to perform a switching operation for a packetized voice message transmitted/received to/from the mobile communication terminal; and
  a content server configured to receive the packetized voice message from the mobile switching center, to store the packetized voice message in a voice message database on a packet-by-packet basis, and to output each packet to the mobile switching center in response to a corresponding packet request signal of the mobile communication terminal.

8. A method of transmitting a voice message of a mobile communication terminal, comprising the steps of:
receiving a communication connection request signal from the outside;
outputting a voice channel connection request signal via a mobile communication network;
terminating a voice channel connection upon receiving a connection failure signal via the mobile communication network;
outputting a data channel connection request signal via the mobile communication network and connecting a data channel in response to a return signal indicative of a connection to the data channel;
receiving and packetizing voice data from the outside; and
transmitting the packetized data via the mobile communication network.

9. The method of claim 8, further comprising the steps of:
checking the available memory capacity of a memory unit in the mobile communication terminal to determine whether or not there is available memory to store the packetized data; and
storing the packetized data when there is available memory.

10. The method of claim 9, further comprising the step of deleting the packetized data stored in the memory unit of the mobile communication terminal after the packetized data is transmitted via the mobile communication network.

11. The method of claim 9, further comprising the step of receiving a signal indicative of a request to confirm the voice data inputted from the outside and converting the voice data into audio signals to be played back.

12. The method of claim 9, further comprising the step of receiving a signal indicative of a request to re-record the voice data inputted from the outside and deleting the voice data.

13. A method of transmitting a voice message of a mobile communication terminal, comprising the steps of:
receiving a communication connection request signal from the outside;
outputting a voice channel connection request signal via a mobile communication network;
terminating a voice channel connection upon receiving a connection failure signal via the mobile communication network;
outputting a data channel connection request signal via the mobile communication network and connecting a data channel in response to a return signal indicative of a connection to the data channel;
receiving voice data from the outside and storing the voice data in a memory unit of the mobile communication terminal;
packetizing the voice data stored in the memory unit; and
transmitting the packetized data via the mobile communication network.

14. The method of claim 13, further comprising the step of deleting the packetized data stored in the memory unit of the mobile communication terminal after the packetized data is transmitted via the mobile communication network.

* * * * *